(No Model.)

J. E. LOW.
ARTIFICIAL DENTURE.

No. 319,829. Patented June 9, 1885.

Witnesses
Jno. W. Stockett
C. C. Poole

Inventor:
James E. Low
by M. E. Dayton
Attorney

UNITED STATES PATENT OFFICE.

JAMES E. LOW, OF CHICAGO, ILLINOIS.

ARTIFICIAL DENTURE.

SPECIFICATION forming part of Letters Patent No. 319,829, dated June 9, 1885.

Application filed July 16, 1884. (No model.)

*To all whom it may concern:*

Be it known that I, JAMES E. LOW, of Chicago, in the county of Cook and State of Illinois, have invented certain new and useful Improvements in Artificial Dentures; and I do hereby declare that the following is a full, clear, and exact description thereof, reference being had to the accompanying drawings and to the letters of reference marked thereon, which form a part of this specification.

This invention relates to an improvement in artificial dentures; and it consists in the matters hereinafter described and pointed out in the claims.

In the construction of artificial dentures as proposed by this invention, a separate metal socket or base is used for and forms part of each tooth in every form and size of denture, and the porcelain crown, body, or veneer that forms the rest of the tooth is attached thereto. The metal bases or porcelain parts may be fastened together by means of dowel-pins or rivets and solder either before proceeding to form the denture or after the metal portion of the denture is completed; but preferably the porcelain bodies and metal bases are provided with interlocking recesses and projections upon their adjacent faces, and the porcelain bodies are secured to the metal bases or sockets after the denture has been finished by means of cement. The separate metal bases or sockets mentioned are so constructed that they may be soldered or otherwise secured together to form either partial or full dentures, and a single base, or several bases thus secured together may be soldered to clasps for attaching the denture to adjacent natural teeth; or such base or bases may be soldered to a crown attached to a natural root, or to a band which may be secured in the mouth of the wearer by any of the means or devices now known, or attached to a whole or partial suction-plate. Metal sockets or bases having the cutting or grinding surfaces formed upon them are preferred, especially in dentures that are rigidly attached to natural teeth or roots, but where the bases are soldered to a full or partial plate the said cutting or grinding surfaces may be formed on the porcelain portion of the denture.

Figures 1, 2, 3, 4:
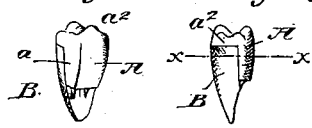
Figures 5, 6, 7, 8, 9:
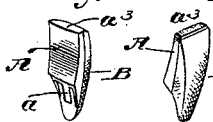
Figures 10, 11, 12, 13, 14:
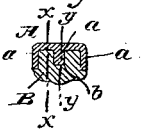
Figures 15, 16, 17, 18, 19, 20:
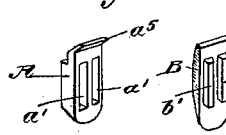
Figures 21, 22, 23:
Figures 24, 25, 26:
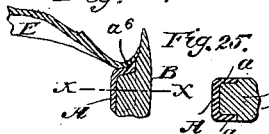
Figure 27:
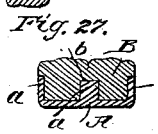

In the accompanying drawings, Figure 1 is a perspective view, and Fig. 2 a side elevation, of an artificial tooth and base combined made in accordance with the present invention. Fig. 3 is a horizontal section on x x, Fig. 2, and Fig. 4 is a rear elevation of the metal base or socket shown in Figs. 1, 2, and 3. Fig. 5 is a perspective view of the inside, Fig. 6 a perspective view of the outside, and Fig. 7 a side elevation of a tooth, of which the porcelain body or veneer is shown in perspective in Fig. 8 and the metal socket or base in perspective in Fig. 9. Fig. 10 is a horizontal cross-section of the same tooth. Fig. 11 is a section on x x, and Fig. 12 a section on y y, Fig. 10. Figs. 13 and 14 are vertical sections showing a modified form of the construction shown in previous figures, in which the dental surface is formed by the metal socket or base and the porcelain body or veneer is continued to the outer corner of the tooth, so that the metal is nearly or quite hidden by the porcelain when the denture is in the wearer's mouth. Fig. 15 is a perspective view of the inside of the metal socket, and Fig. 16 a similar view of the porcelain body or veneer of a tooth, of which Fig. 17 is a side elevation. Fig. 18 is a side elevation of the porcelain body of a tooth of which Fig. 19 is a perspective view of the metal base or socket, and Fig. 20 a perspective view of the whole tooth and base combined. Fig. 21 is a horizontal section of a partial denture of bridge form made in accordance with the present invention. Fig. 22 is a perspective view of a portion of a bridge-denture, showing the metal sockets secured to each other and to a strip or band, the ends of which are attached to clasps or bands adapted to embrace adjacent natural teeth. Fig. 23 is a vertical section of a plate-denture, showing a socket attached thereto by solder. Fig. 24 is a similar section of a plate-denture in which the dental or grinding surface of the tooth is formed on the porcelain body or veneer. Fig. 25 is a horizontal section of the porcelain body and socket shown in Fig. 24, taken upon line x x of said figure. Fig. 26 is a vertical section through a tooth and base combined, showing the porcelain body attached to the metal socket or base, into which it partially enters, by platinum pins riveted in or soldered to the metal socket. Fig. 27 is a sectional view showing a single metal base and porcelain body attached thereto forming a denture of two teeth.

A is a metal base or socket which, while serving as a base, also forms a part of the tooth, and B is the porcelain part of the tooth.

C, Figs. 21 and 22, is a metallic band or clasp which may be secured to the end or ends of a partial denture for supporting the latter from adjacent natural teeth or stumps, the said clasp, as shown in Fig. 21, being soldered to the ends of a block or denture formed by securing two or more bases B together, and in Fig. 22 as formed by soldering said bases to a band or strip, D, attached at its end to the said clasp. E, Figs. 23 and 24, is a metallic suction-plate to which the teeth are attached to form a full or partial denture.

In all the forms shown in the drawings from Fig. 1 to Fig. 25, both inclusive, the metal base A and the porcelain body B are provided with interlocking recesses and projections, whereby the porcelain body or veneer and the metal base or socket are adapted to be fastened together with cement and without the use of rivets or solder, although in all these forms the porcelain body or veneer may be supplied with dowel-pins, rivets, staples, or other devices in the process of manufacture, and the parts thereby secured together without the use of cement. Cementing, without the use of rivets or solder is, however, preferred. As shown in Figs. 1 to 12, inclusive, and in Figs. 21 and 22, the metal base A is provided with projections $a\ a$, which fit accurately into recesses $b\ b$ in the porcelain body or veneer B, and in Figs. 13 to 20, inclusive, and in Figs. 23, 24, and 25 the porcelain body or veneer B is provided with projections $b'$, fitted into recesses $a'$ in the metal part or base. In that form shown in Fig. 26 the recesses and projections in and on the bodies of the two parts of the tooth and base combined are dispensed with, and the porcelain body is fastened to the base solely by metal dowel-pins or rivets $e$, which are embedded in the porcelain body or veneer B, and riveted or soldered, or both riveted and soldered, to the metal socket or base. This form of fastening may be used to advantage, although the use of cement, and the interlocking or interpenetrating recesses and projections in or on the adjacent faces of the two parts, is preferred. It is impracticable to show all the forms that the interlocking and interpenetrating devices may assume in actual practice, as their forms will be more or less modified by the shapes of the various teeth and other circumstances. The forms shown and described, however, fully illustrate the invention and the manner in which it may be carried out in practice. The relative bulk and the actual size, shape, and thickness of the two parts of the tooth will also vary to a considerable extent to meet the exigencies of actual practice in fitting dentures, and various special difficulties and requirements in different cases. In some cases the metal base or socket may form only a thin shell partially surrounding or a thin plate at the back or inner side of the porcelain body or veneer, as shown, for instance, in Figs. 1 to 14, inclusive, and 18, 19, and 20. In other cases the base or socket may form the bulk of the tooth, while the porcelain portion forms only a comparatively thin veneer covering the outer or exposed surface thereof, as illustrated in Figs. 15, 16, and 17. Between these extremes a great variety of forms and proportions of these two parts may be used.

In the form of tooth shown in Figs. 1 to 4 the base or socket A is provided with a relatively thick or solid portion, $a^2$, which extends over the end of the porcelain part B, and upon which the grinding-surface is formed. In Figs. 5 to 12, inclusive, a front tooth or incisor is shown in which the base or socket A is extended over the end of the porcelain and forms the cutting-edge of the tooth, the said part $a^3$ being relatively thin, so that a narrow line of metal only is visible at the front of the tooth. In Fig. 13 a sectional view of a tooth of the form shown in Figs. 1 to 4, but without the central projection, $a$, is shown. The part $a^2$ of the socket comprising the grinding-surface of the tooth in this case is inwardly and backwardly beveled at its front edges, as indicated at $a^4$, and the porcelain body B is similarly beveled, and its front or outer face extended to the grinding-face at the outer corner of the tooth, so that the metal is nearly or quite hidden by the porcelain. A similar construction of the part $a^4$ at the edge of an incisor is shown in Fig. 14.

In the form of tooth shown in Figs. 15, 16, and 17 the metal base or socket A forms the principal part of the tooth, and the porcelain body B forms a relatively thin covering or veneer that is provided with projections $b'\ b'$, entering recesses $a'$ in the base A. The metal base A is in this case desirably extended to the edge of the tooth, and provided with a flange or lip, $a^5$, arranged to overlap the edge of the porcelain part, so as to take the end-pressure coming upon the tooth, and preferably beveled upon its surface adjacent to the tooth, in order that a fine edge of metal only will be visible when the tooth is in the wearer's mouth.

In Figs. 18, 19, and 20 the base A is in the form of a hollow shell, which extends over and around the rear and end surfaces of the tooth and partially over the sides and front thereof, so that the porcelain part B forms the body or main portion of the tooth, and the metal base the grinding-surface thereof.

In Fig. 23 a form of the metal socket or base and porcelain body, in which the parts are secured together by cement and the dental or grinding surface is formed by an extension, $a^2$, of the metal of the socket, is shown as attached to an ordinary suction-plate, E, and in Figs. 24 and 25 a tooth, in which the grinding-surface is formed by the porcelain body B, is shown as attached to a similar plate. The base or socket A (shown in Fig. 24) is desirably provided with a part, $a^6$, at its end adjacent to the plate, said part serving to connect the side walls of the socket and to give an extended surface in contact with the metal of the plate, whereby said socket may be more readily and securely attached to the plate by soldering.

In Fig. 26 the base A and porcelain body B, comprising a tooth, are shown as secured together by means of metal dowel-pins or rivets, $e$, which are embedded in the porcelain body in the process of manufacture in a well-known manner, and are secured at their ends in the base B, either by riveting or soldering, but preferably by both. The metal bases and porcelain parts secured together, as above described, may be united to form partial or bridge dentures by soldering the bases together, or the bases may be soldered to a suction-plate in the same manner as before described in connection with the form of tooth in which the parts mentioned are united by cement.

The form of the tooth in which the dental or grinding surface thereof is formed by the metal base or socket is preferred in the case of partial or bridge dentures supported from adjacent natural teeth or roots, for the reason that the rigid or unyielding support thus afforded for the denture renders the porcelain liable to fracture when brought into contact with a hard substance or opposing teeth. In the case of suction-plates, however, which afford a relatively-yielding support to the teeth, the form of the latter in which the grinding or cutting edges are upon the porcelain parts thereof may be advantageously used.

An advantage of the form of base illustrated in Figs. 15, 16, and 17, in which the said base is extended to and over the cutting-edge of the tooth, is that, especially in the case of the upper teeth, any outward pressure of the opposing or lower teeth upon the ends thereof is taken by said base, and liability of the porcelain part being separated by such pressure from the base is thereby obviated.

Instead of constructing each tooth with a separate porcelain part or base, the porcelain parts of two or more teeth may be made together in a single block with a single metal base, these blocks being used with other similar blocks or single teeth in forming either whole or partial dentures, as hereinbefore described. This construction is illustrated in Fig. 27.

In carrying out this invention it is intended that the individual teeth, or blocks of two or more connected teeth comprising a porcelain part or body and a metal base, shall be made in all of the necessary forms and sizes and be kept on hand ready for use in order to facilitate the work of the dentist, although this is not essential, because each of the parts may be made as required without departing from the essential features and character of the invention. In forming a denture, the usual molds may be made, and the various individual bases fitted thereto and soldered together and to the clasps, band, plate or other device used for fastening the denture in the mouth. When the metal bases have been connected to form the denture in the manner described, the porcelain bodies or veneers may be inserted and cemented fast without further heating or refitting of the denture, the said porcelain parts preferably being inserted after the soldering is finished, in order to prevent such parts from being cracked by the heat used in soldering.

In case any of the porcelain parts are cracked or broken while the denture is in use, or at any other time, the broken part may be easily removed and replaced by a new one.

In case that form of construction is used in which the porcelain part is secured by means of pins soldered to the metal part, the two parts of the teeth may be fastened together either before or after the individual bases are soldered together.

The word tooth, as used in the appended claims, is intended to mean either a single tooth or a block of two or more teeth made of a single piece or body of porcelain and provided with a single metal base.

Among the advantages secured by the use of teeth composed of separate metal bases and porcelain bodies as above described, may be mentioned the facility with which the metal base or foundation for a denture may be constructed by soldering together the several bases belonging to teeth selected to fit them, the greater strength of a denture constructed as described, and its compactness, less thickness being necessary in the denture in order to obtain a given amount of strength for the reason that the bases in this case occupy a part of the space heretofore taken up by the porcelain teeth. An important advantage is gained by the use of cement for securing the porcelain parts to the metal bases on account of the facility with which the porcelain parts may be renewed when fractured or otherwise injured, and from the fact that the said porcelain parts may be thereby secured in place after the metal part of the denture is completed, so that danger of breaking the porcelain parts by the heat used in soldering is obviated.

The use of metal bases and porcelain bodies or veneers is of special advantage in the making of bridge-dentures, the construction of which has heretofore been expensive and tedious on account of the difficulty of shaping the metal part thereof so as to fit the place in which it is to be inserted and to obtain the requisite strength therein, and of properly securing the porcelain teeth thereto. A bridge-denture composed of metal and porcelain parts, as herein set forth, is therefore claimed as part of this invention.

I claim as my invention—

1. A tooth for use in the construction of artificial dentures, comprising a metal base or socket adapted for attachment by means of solder or otherwise to other similar bases or to a metallic support or supports, and a porcelain body or veneer, said metal base or socket and porcelain body or veneer being provided with interlocking recesses and projections and united by cement, substantially as and for the purpose set forth.

2. A bridge-denture consisting of two or more separate metal bases or sockets soldered or otherwise secured to each other, and porcelain bodies or veneers secured to the bases or sockets, substantially as and for the purpose set forth.

In testimony that I claim the foregoing as my invention I affix my signature in presence of two witnesses.

JAMES E. LOW.

Witnesses:
C. CLARENCE POOLE.
OLIVER C. PAGIN.